United States Patent
Kim et al.

(10) Patent No.: US 9,356,723 B2
(45) Date of Patent: May 31, 2016

(54) METHOD FOR TRANSMITTING UPLINK SIGNALS FROM A USER EQUIPMENT TO A BASE STATION IN A WIRELESS COMMUNICATION SYSTEM AND METHOD FOR THE SAME

(75) Inventors: Kitae Kim, Anyang-si (KR); Jinyoung Chun, Anyang-si (KR); Hyunsoo Ko, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 14/342,321

(22) PCT Filed: Jun. 21, 2012

(86) PCT No.: PCT/KR2012/004892
§ 371 (c)(1),
(2), (4) Date: Feb. 28, 2014

(87) PCT Pub. No.: WO2013/035974
PCT Pub. Date: Mar. 14, 2013

(65) Prior Publication Data
US 2014/0204922 A1  Jul. 24, 2014

Related U.S. Application Data

(60) Provisional application No. 61/531,624, filed on Sep. 7, 2011.

(51) Int. Cl.
*H04J 3/00* (2006.01)
*H04J 3/12* (2006.01)
*H04W 56/00* (2009.01)

(52) U.S. Cl.
CPC ............. *H04J 3/12* (2013.01); *H04W 56/0045* (2013.01)

(58) Field of Classification Search
CPC .................................................. H04W 72/0446
USPC .......................................................... 370/336
See application file for complete search history.

(56) References Cited

U.S. PATENT DOCUMENTS

| | | | |
|---|---|---|---|
| 2009/0034505 A1* | 2/2009 | Papasakellariou | .... H04L 5/0007 370/344 |
| 2010/0135273 A1* | 6/2010 | Kim | ......... H04B 1/69 370/344 |

(Continued)

FOREIGN PATENT DOCUMENTS

| CN | 101617489 | 12/2009 |
|---|---|---|
| KR | 10-2010-0123655 | 11/2010 |

(Continued)

OTHER PUBLICATIONS

PCT International Application No. PCT/KR2012/004892, Notification of Transmittal of the International Search Report and the Written Opinion of the International Searching Authority, or Declaration dated Jan. 2, 2013, 9 pages.

(Continued)

*Primary Examiner* — Christopher R Crompton
(74) *Attorney, Agent, or Firm* — Lee, Hong, Degerman, Kang & Walmey; Jonathan Kang; Michael Monaco

(57) ABSTRACT

A method for transmitting uplink signals from a user equipment to a base station in a time division multiplexing wireless communication system is disclosed. The method comprises the steps of transmitting a first uplink signal on an uplink subframe or a special subframe that precedes the uplink subframe, by preceding a first timing advance value at a reference time; and transmitting a second uplink signal on the uplink subframe by preceding a second timing advance value at the reference time, wherein the first timing advance value is greater than the second timing advance value, and the first uplink signal is transmitted for an uplink pilot time slot (UpPTS) period of the special subframe if a difference value between the first timing advance value and the second timing advance value is greater than a preset value.

14 Claims, 17 Drawing Sheets

(56) References Cited

U.S. PATENT DOCUMENTS

| | | | | |
|---|---|---|---|---|
| 2011/0170462 A1* | 7/2011 | Hao | ................... | H04W 74/002 370/280 |
| 2013/0016705 A1* | 1/2013 | Zhang | ................... | H04L 5/0048 370/336 |

FOREIGN PATENT DOCUMENTS

| KR | 10-2010-0132464 | 12/2010 |
|---|---|---|
| KR | 10-2011-0011568 | 2/2011 |
| WO | WO 2010/118701 | * 10/2010 |
| WO | 2010131934 | 11/2010 |
| WO | 2010143884 | 12/2010 |
| WO | 2011013977 | 2/2011 |

OTHER PUBLICATIONS

The State Intellectual Property Office of the People's Republic of China Application Serial No. 201280043574.6, Office Action dated Apr. 1, 2016, 13 pages.

* cited by examiner

METHOD FOR TRANSMITTING UPLINK SIGNALS FROM A USER EQUIPMENT TO A BASE STATION IN A WIRELESS COMMUNICATION SYSTEM AND METHOD FOR THE SAME

CROSS-REFERENCE TO RELATED APPLICATIONS

This application is the National Stage filing under 35 U.S.C. 371 of International Application No. PCT/KR2012/004892, filed on Jun. 21, 2012, which claims the benefit of U.S. Provisional Application Ser. No. 61/531,624, filed on Sep. 7, 2011, the contents of which are hereby incorporated by reference herein in their entirety.

TECHNICAL FIELD

The present invention relates to a wireless communication system, and more particularly to a method for transmitting uplink signals from a user equipment to a base station in a wireless communication system and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE OF INVENTION

Technical Problem

An object of the present invention devised to solve the conventional problem is to provide a method for transmitting uplink signals from a user equipment to a base station in a wireless communication system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Solution to Problem

To solve the aforementioned technical problems, according to one aspect of the present invention, a method for transmitting uplink signals from a user equipment to a base station in a time division multiplexing wireless communication system comprises the steps of transmitting a first uplink signal on an uplink subframe or a special subframe that precedes the uplink subframe, by preceding a first timing advance value at a reference time; and transmitting a second uplink signal on the uplink subframe by preceding a second timing advance value at the reference time, wherein the first timing advance value is greater than the second timing advance value, and the first uplink signal is transmitted for an uplink pilot time slot (UpPTS) period of the special subframe if a difference value between the first timing advance value and the second timing advance value is greater than a preset value.

In another aspect of the present invention, a user equipment in a time division multiplexing wireless communication system comprises a wireless communication module for transmitting and receiving signals to and from at least one base station; and a processor for controlling the wireless communication module, wherein the processor transmits a first uplink signal on an uplink subframe or a special subframe that precedes the uplink subframe, by preceding a first timing advance value at a reference time, and transmits a second uplink signal on the uplink subframe by preceding a second timing advance value at the reference time, the first timing advance value is greater than the second timing advance value, and the first uplink signal is transmitted for an uplink pilot time slot (UpPTS) period of the special subframe if a difference value between the first timing advance value and the second timing advance value is greater than a preset value.

Preferably, the preset value is one of a length of a first symbol and a length of a second symbol.

In this case, the special subframe includes a downlink pilot time slot (DwPTS) for downlink reception, a guard period (GP) for transmission and reception switching, and the UpPTS for uplink transmission, in due order. The first uplink signal is a sounding reference signal, and the second uplink signal is uplink control information or uplink data information.

Also, the first uplink signal may be transmitted through a carrier different from that through which the second uplink signal is transmitted. Also, the first uplink signal may be transmitted to a base station different from that to which the second uplink signal is transmitted.

Moreover, the distance between the user equipment and the base station to which the first uplink signal is transmitted is longer than that between the user equipment and the base station to which the second uplink signal is transmitted.

Advantageous Effects of Invention

According to the embodiments of the present invention, the user equipment may perform efficient signal transmission to the base station in the wireless communication system. In more detail, according to the present invention, the user equipment may perform efficient uplink signal transmission in case that separate timing advance is applied to each of individual uplink channels or uplink signals.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3$^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE.

Although the following description will be based on the 3GPP LTE/LTE-A to clarify description, it is to be understood that technical spirits of the present invention are not limited to the 3GPP LTE/LTE-A. Also, specific terminologies used in the following description are provided to assist understanding of the present invention, and may be modified to other terminologies within the range that does not depart from technical spirits of the present invention.

In a wireless communication system, a user equipment receives information from a base station through a downlink (DL), and also transmits information to the base station through an uplink (UL). Examples of information transmitted from or received in the user equipment include data and various kinds of control information, and various physical channels exist depending on a type and usage of the information transmitted from or received in the user equipment.

Figure 1:
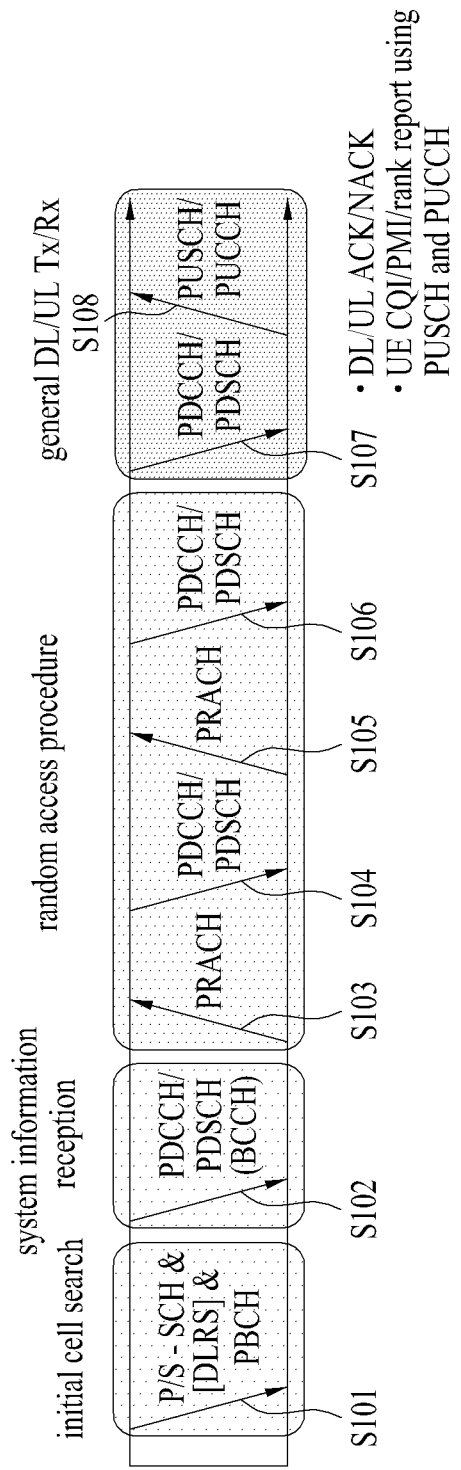
FIG. 1 is a diagram illustrating physical channels used in a 3GPP LTE system which is an example of a wireless communication system and a general method for signal transmission using the physical channels.

FIG. 1 is a diagram illustrating physical channels used in a 3GPP LTE system and a general method for signal transmission using the physical channels.

The user equipment performs initial cell search such as synchronizing with the base station when it newly enters a cell or the power is turned on at step S101. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S102.

Afterwards, the user equipment may perform a random access procedure (RACH) such as steps S103 to S106 to complete access to the base station. To this end, the user equipment may transmit a preamble through a physical random access channel (PRACH) (S103), and may receive a response message to the preamble through the PDCCH and the PDSCH corresponding to the PDCCH (S104). In case of a contention based RACH, the user equipment may perform a contention resolution procedure such as transmission (S105) of additional physical random access channel and reception (S106) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S107) and transmit a physical uplink shared channel (PUSCH) and a physical uplink control channel (PUCCH) (S108), as a general procedure of transmitting uplink/downlink signals. Control information transmitted from the user equipment to the base station or received from the base station to the user equipment will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will simply be referred to as HARQ-ACK or ACK/NACK(A/N). HARQ-ACK includes at least one of positive ACK (simply, ACK), negative ACK (NACK), DTX and NACK/DTX. CSI includes a CQI (Channel Quality Indicator), a PMI (Precoding Matrix Indicator), RI (Rank Indication), etc. Although the UCI is transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 2:
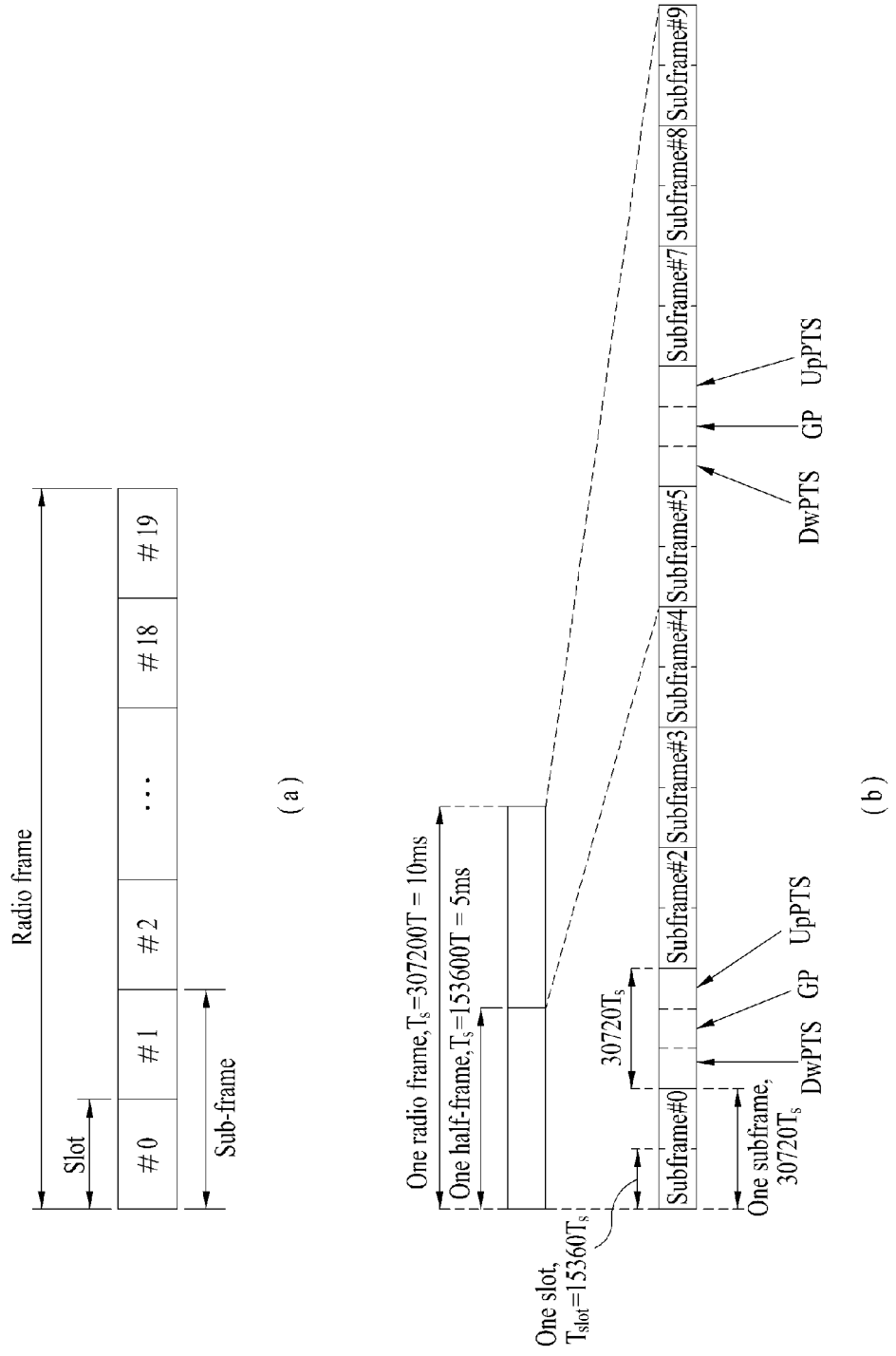
FIG. 2 is a diagram illustrating a structure of a radio frame.

FIG. 2 is a diagram illustrating a structure of a radio frame. In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 2(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since OFDMA is used on a downlink in the 3GPP LTE system, OFDM symbols represent one symbol interval. The OFDM symbols may be referred to as SC-FDMA symbols or symbol interval. The resource block as resource allocation unit may include a plurality of continuous subcarriers in one slot.

The number of OFDM symbols included in one slot may be varied depending on configuration of CP. Examples of the CP include extended CP and normal CP. For example, if the OFDM symbols are configured by normal CP, the number of OFDM symbols included in one slot may be 7. If the OFDM symbols are configured by extended CP, since the length of one OFDM symbol is increased, the number of OFDM symbols included in one slot is smaller than that of OFDM symbols in case of normal CP. In case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 2(b) is a diagram illustrating a structure of a type 2 radio frame. The type 2 radio frame includes two half frames, each of which includes four normal subframes and a special subframe. The normal subframe includes two slots and the special subframe includes a downlink pilot time slot (DwPTS), a guard period (GP), and an uplink pilot time slot (UpPTS).

In the special subframe, DwPTS is used for initial cell search, synchronization or channel estimation at the user equipment. UpPTS is used to synchronize channel estimation at the base station with uplink transmission of the user equipment. In other words, DwPTS is used for downlink transmission, and UpPTS is used for uplink transmission. In particular, UpPTS is used for PRACH preamble or SRS transmission. Also, the guard period is to remove interference occurring in the uplink due to multipath delay of downlink signals between the uplink and the downlink.

The current 3GPP standard document defines the special subframe as illustrated in Table 1 below. In Table 1, $T_S$ (=1/(15000*2048)) represents DwPTS and UpPTS, and the other region is set to the guard period.

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Meanwhile, the structure of the type 2 radio frame, that is, UL/DL configuration in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D indicates a downlink subframe, U indicates an uplink subframe, and S means the special subframe. Also, the above Table 2 represents a downlink-uplink switching period of uplink/downlink subframe configuration in each system.

The aforementioned structure of the radio frame is only exemplary, and various modifications may be made in the number of subframes included in the radio frame, the number of slots included in the subframe, or the number of symbols included in the slot.

Figure 3:
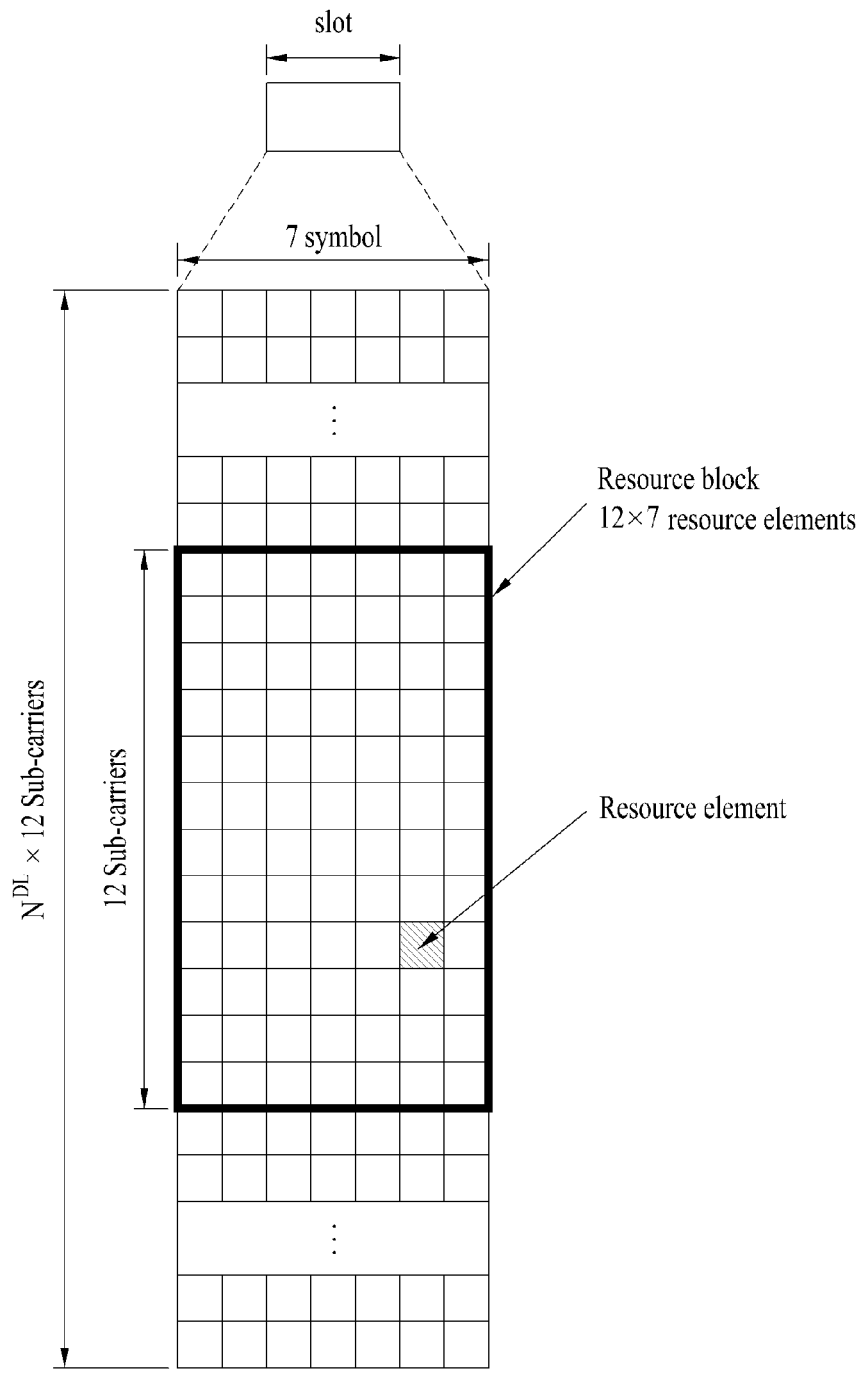
FIG. 3 is a diagram illustrating a resource grid of a radio frame.

FIG. 3 is a diagram illustrating a resource grid of a downlink slot.

Referring to FIG. 3, the downlink slot includes a plurality of OFDM symbols. One downlink slot may include seven (six) OFDM symbols in a time domain, and one resource block may include twelve subcarriers in a frequency domain. Each element on the resource grid will be referred to as a resource element (RE). One resource block (RB) includes 12×7(6) resource elements. The number NRB of resource blocks (RBs) included in the downlink slot depends on a downlink transmission bandwidth. A structure of the uplink slot is the same as that of the downlink slot but its OFDM symbols are replaced with SC-FDMA symbols.

Figure 4:
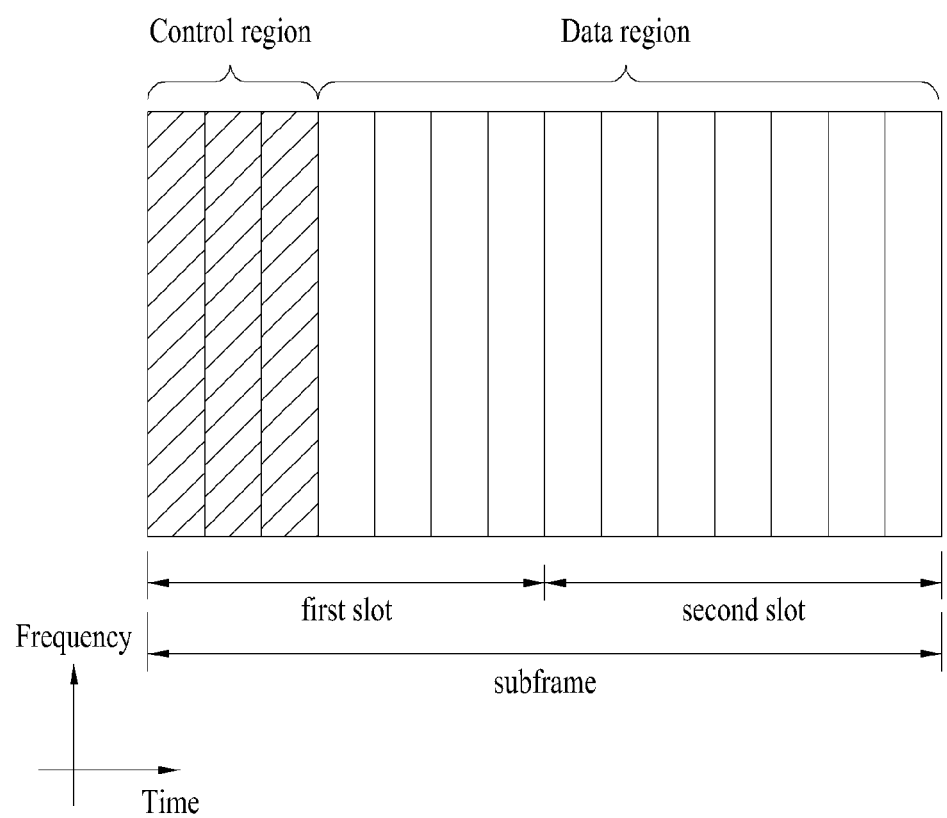
FIG. 4 is a diagram illustrating a structure of a downlink subframe.

FIG. 4 is a diagram illustrating a structure of a downlink subframe.

Referring to FIG. 4, maximum three (four) OFDM symbols located at the front of the first slot within one subframe correspond to a control region to which a control channel is allocated. The other OFDM symbols correspond to a data region to which a physical downlink shared channel (PDSCH) is allocated. Examples of the downlink control channel used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) signals in response to uplink transmission.

Control information transmitted through the PDCCH will be referred to as downlink control information (DCI). The DCI includes resource allocation information for the user equipment or user equipment group and other control information. For example, the DCI includes uplink/downlink scheduling information, uplink transmission (Tx) power control command, etc.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a user equipment group, transmission (Tx) power control information, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or user of the PDCCH. For example, if the PDCCH is for a specific user equipment, an identifier (for example, cell-RNTI (C-RNTI)) of the corresponding user equipment may be masked with the CRC. If the PDCCH is for a paging message, a paging identifier (for example, Paging-RNTI (P-RNTI)) may be masked with the CRC. If the PDCCH is for system information (in more detail, system information block (SIB)), a system information identifier and system information RNTI (SI-RNTI) may be masked with the CRC. If the PDCCH is for random access response, a random access RNTI (RA-RNTI) may be masked with the CRC.

Figure 5:
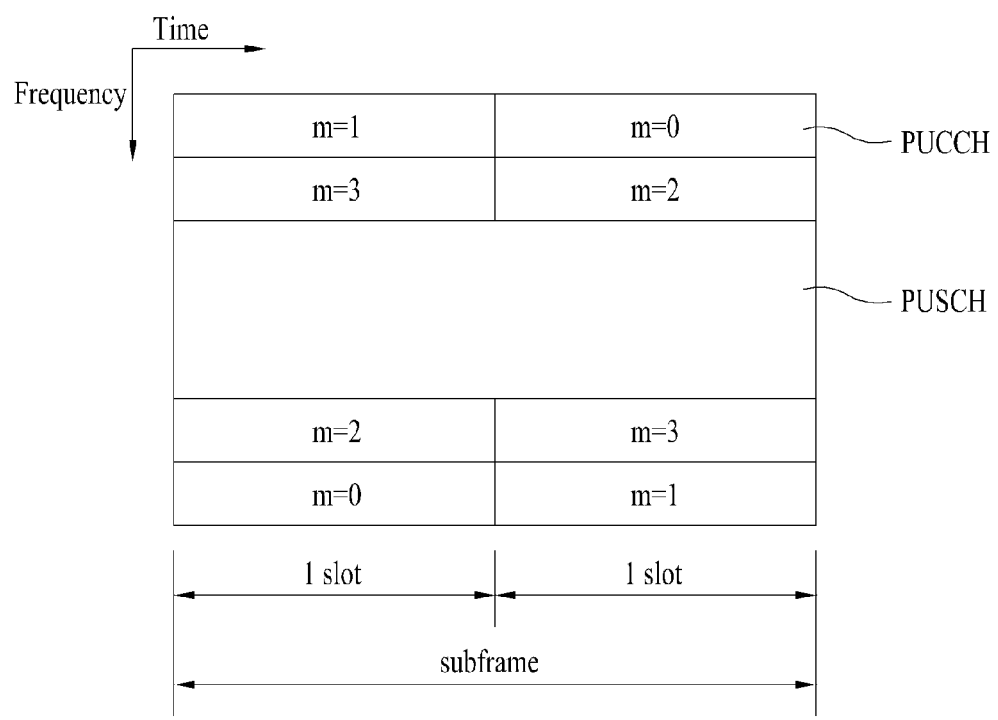
FIG. 5 is a diagram illustrating a structure of an uplink subframe.

FIG. 5 is a diagram illustrating a structure of an uplink subframe used in the LTE.

Referring to FIG. 5, the uplink subframe includes a plurality of slots (for example, two slots). The respective slots may include their respective SC-FDMA symbols different from those of the other slots in accordance with a CP length. The uplink subframe may be divided into a control region and a data region on a frequency domain. The data region includes a PUSCH and is used to transmit a data signal such as voice. The control region includes a PUCCH and is used to transmit uplink control information (UCI). The PUCCH includes RB pair located at both ends of the data region on a frequency axis, and performs hopping on the border of the slots.

The PUCCH may be used to transmit the following control information.

1. SR (Scheduling Request): is information used to request uplink UL-SCH resource. The SR is transmitted using an on-off keying (OOK) system.

2. HARQ ACK/NACK: is a response signal to a downlink data packet on the PDSCH. It represents whether the downlink data packet has been successfully received. ACK/NACK 1 bit is transmitted in response to a single downlink codeword, and ACK/NACK 2 bits are transmitted in response to two downlink codewords.

3. CSI (Channel State Information): is feedback information on a downlink channel. The CSI includes a channel quality indicator (CQI), and MIMO (Multiple Input Multiple Output) related feedback information includes a rank indicator (RI), a precoding matrix indicator (PMI), a precoding type indicator (PTI), etc. 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH.

Figure 6:
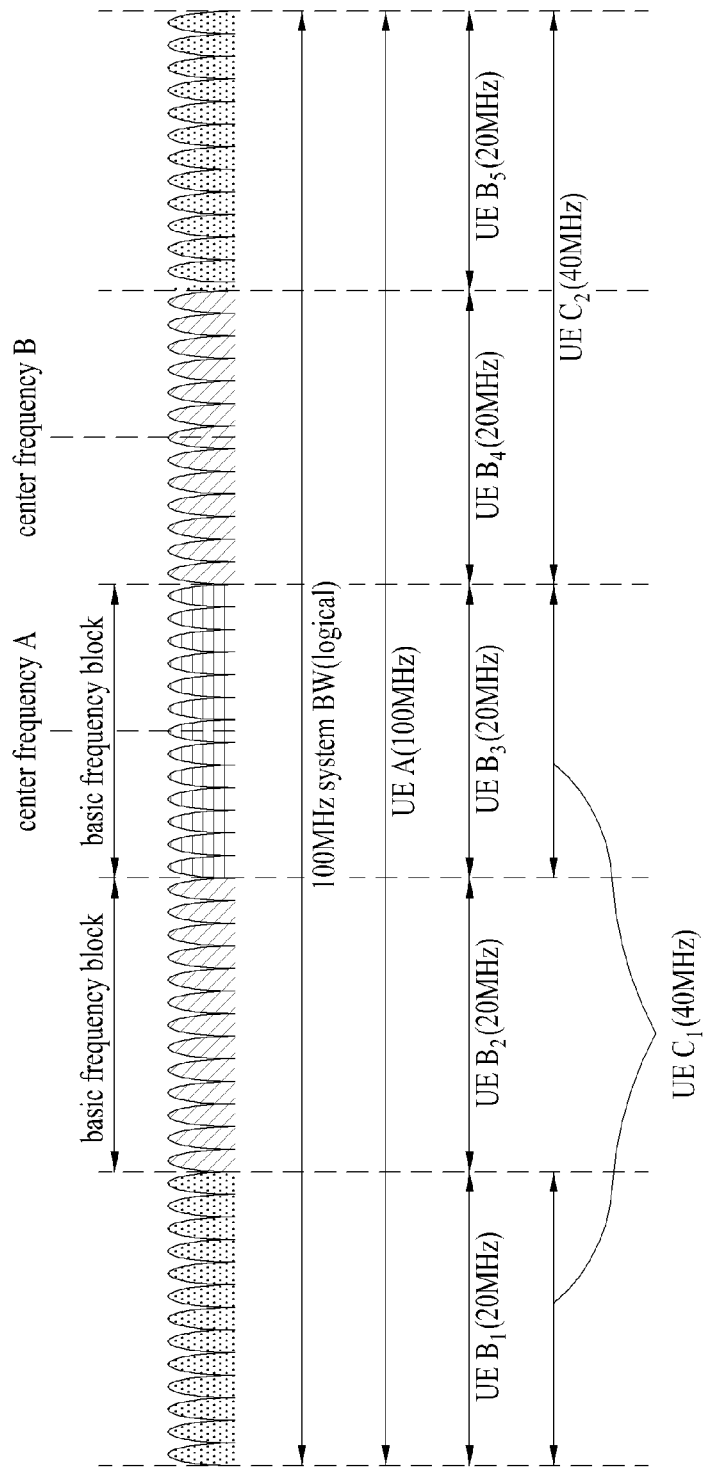
FIG. 6 is a conceptional diagram illustrating a carrier aggregation scheme.

Hereinafter, a carrier aggregation scheme will be described. FIG. 6 is a conceptional view illustrating carrier aggregation.

The carrier aggregation means that the user equipment uses a plurality of frequency blocks or (logical) cells, which include uplink resources (or component carriers) and/or downlink resources (or component carriers), as one large logical frequency band to enable a wireless communication system to use a wider frequency band. Hereinafter, for convenience of description, the carrier aggregation will be referred to as component carriers.

Referring to FIG. 6, a whole system bandwidth (system BW) is a logical band and has a bandwidth of 100 MHz. The whole system bandwidth includes five component carriers, each of which has a bandwidth of maximum 20 MHz. The component carrier includes at least one or more physically continuous subcarriers. Although the respective component carriers have the same bandwidth in FIG. 6, it is only exemplary, and the component carriers may have their respective bandwidths different from one another. Also, although the respective component carriers adjoin each other in the frequency domain as shown, the drawing just represents the logical concept. The respective component carriers may logically adjoin each other, or may be spaced apart from each other.

A center frequency may be used differently for each of the component carriers. Alternatively, one center frequency common for physically adjoining component carriers may be used. For example, assuming that all component carriers are physically adjacent to one another in FIG. 6, a center frequency 'A' may be used. Assuming a case that the respective component carriers are not physically adjacent to each other, a center frequency 'A' for one component carrier, a center frequency 'B' for another component carrier and the like may be used.

In this specification, a component carrier may correspond to a system bandwidth of a legacy system. By defining a component carrier based on a legacy system, it is possible to facilitate provision of backward compatibility and system design in a wireless communication environment in which an evolved user equipment and a legacy user equipment coexist. For example, in case that the LTE-A system supports carrier aggregation, each component carrier may correspond to a system bandwidth of the LTE system. In this case, the component carrier may have a bandwidth selected from the group including 1.25 MHz, 2.5 MHz, 5 MHz, 10 MHz and 20 MHz.

In case that a whole system band is extended by carrier aggregation, a frequency band used for communication with each user equipment is defined by a component carrier unit. A user equipment A may use a whole system bandwidth of 100 MHz and performs communication using five component carriers all. User equipments $B_1$ to $B_5$ may use a bandwidth of 20 MHz only, and each of the user equipments $B_1$ to $B_5$ performs communication using one component carrier. User equipment $C_1$ and user equipment $C_2$ may use a bandwidth of 40 MHz. Each of the user equipment $C_1$ and the user equipment $C_2$ performs communication using two component carriers. In this case, these two component carriers may be logically/physically adjacent to each other or may not. The user equipment $C_1$ represents a case of using two component carriers that are not adjacent to each other. And, the user equipment $C_2$ represents a case that two adjacent component carriers are used.

One downlink component carrier and one uplink component carrier are used in the LTE system, whereas several component carriers may be used in the LTE-A system. At this time, a scheme of scheduling a data channel through a control channel may be divided into a linked carrier scheduling scheme of the related art and a cross carrier scheduling scheme.

In more detail, according to the linked carrier scheduling scheme, like the existing LTE system that uses a single component carrier, a control channel transmitted through a specific component carrier performs scheduling for a data channel only through the specific component carrier.

In the mean time, according to the cross carrier scheduling scheme, a control channel transmitted through a primary component carrier (CC) using a carrier indicator field (CIF) performs scheduling for a data channel transmitted through the primary component carrier or another component carrier.

Figure 7:
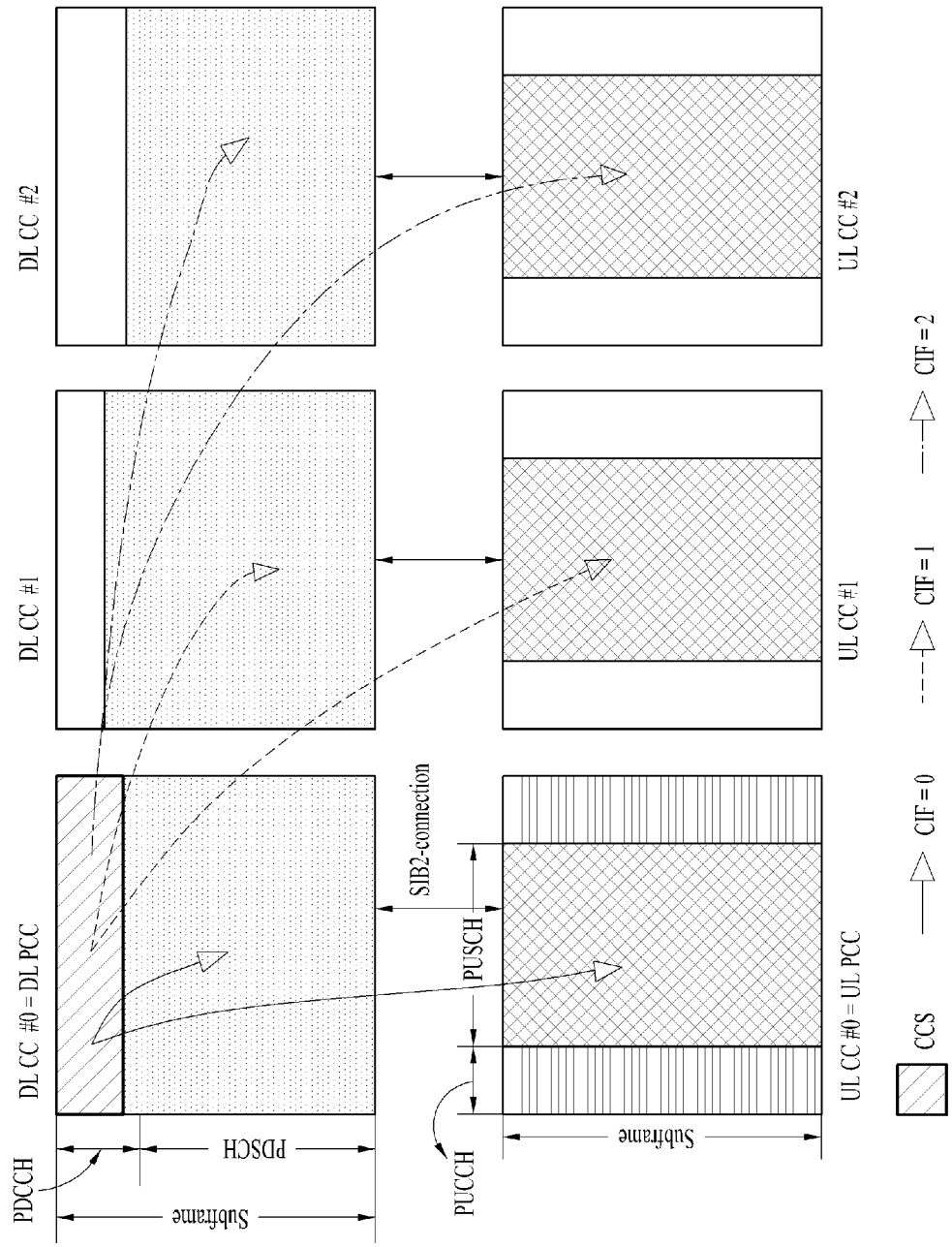
FIG. 7 is a diagram illustrating an application example of a cross carrier scheduling scheme.

FIG. 7 is a diagram illustrating an application example of a cross carrier scheduling scheme. In particular, in FIG. 7, the number of cells (or component carriers) allocated to the user equipment is three, and the cross carrier scheduling scheme is performed using CIF as described above. In this case, it is assumed that a downlink cell (or component carrier) #0 and an uplink cell (or component carrier) #0 are a primary downlink component carrier (i.e., primary cell (PCell)) and a primary uplink component carrier, respectively. It is also assumed that the other component carriers are secondary component carriers (i.e., secondary cell (SCell)).

In the current wireless communication environment, data request for a cellular network has been rapidly increased in accordance with the advent and spread of various devices that requires machine-to-machine (M2M) communication and high data rate. In order to satisfy the high data request, the communication technology has been developed to carrier aggregation for efficient use of more frequency bands, and has been developed to the multi-antenna technology, multi-base station cooperation technology, etc. to increase data capacity within a limited frequency. Also, the communication environment evolves to enhance density of a node that may access the periphery of a user. A system equipped with a node of high density may have higher system throughput through coordination between the nodes. This system acts as a base station (BS), an advanced BS (ABS), eNode-B (eNB), an access point (AP), etc., in which each node is independent, whereby more excellent throughput than the case where there is no coordination between the nodes may be obtained.

Figure 8:
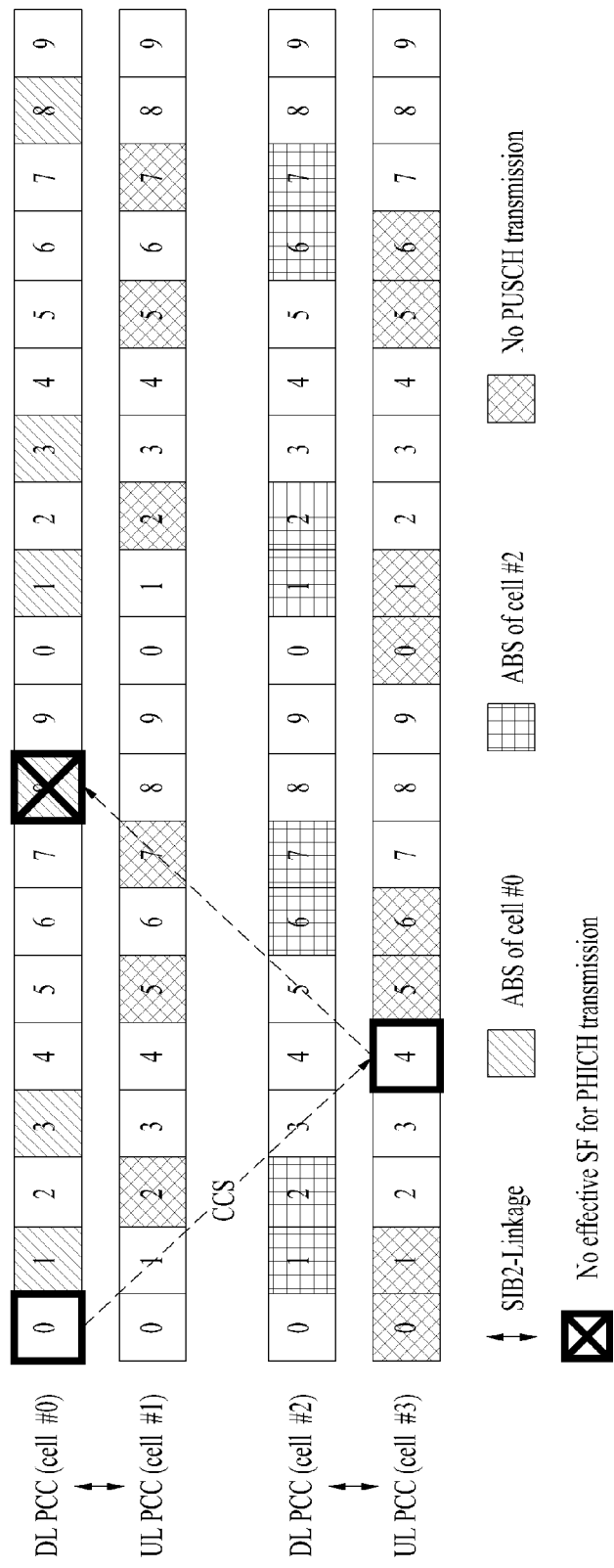
FIG. 8 is a diagram illustrating a multi-node system in a next generation communication system.

FIG. 8 is a diagram illustrating a multi-node system in a next generation communication system.

Referring to FIG. 8, as transmission and reception of all the nodes are controlled by one controller, if each node is operated like some antenna group of one cell, this system may be referred to as a distributed multi node system (DMNS) that forms one cell. At this time, each node may be given Node ID, or may be operated like some antenna within a cell without separate Node ID. However, if the nodes have their respective cell identifier (ID) different from one another, this system may be referred to as a multi cell system. If the multi cells are overlapped with one another in accordance with coverage, this will be referred to as multi-tier network.

In the meantime, Node-B, eNode-B, PeNB, HeNB, remote radio head (RRH), relay, and distributed antennas may be the nodes, and at least one antenna is provided at one node. The node may be referred to as a transmission point. Although the node is generally called antenna groups spaced apart from one another at constant intervals or more, the node may be defined as random antenna group regardless of interval.

Hereinafter, a timing advance (TA) procedure in the LTE system and the LTE-A system will be described.

In the LTE system, in order to maintain uplink orthogonality received from different user equipments, uplink and downlink communication is aligned on a time axis based on the base station eNB. This uplink signal time axis alignment is the basis method that may avoid interference between uplink user equipments within a cell.

Timing advance (TA) in transmission of the user equipment is used to directly implement time axis alignment of uplink transmission. At this time, the user equipment sets a timing advance reference value on the basis of downlink reception timing, and TA of the user equipment is finally determined on the basis of propagation delay corresponding to each user equipment.

Figure 9:
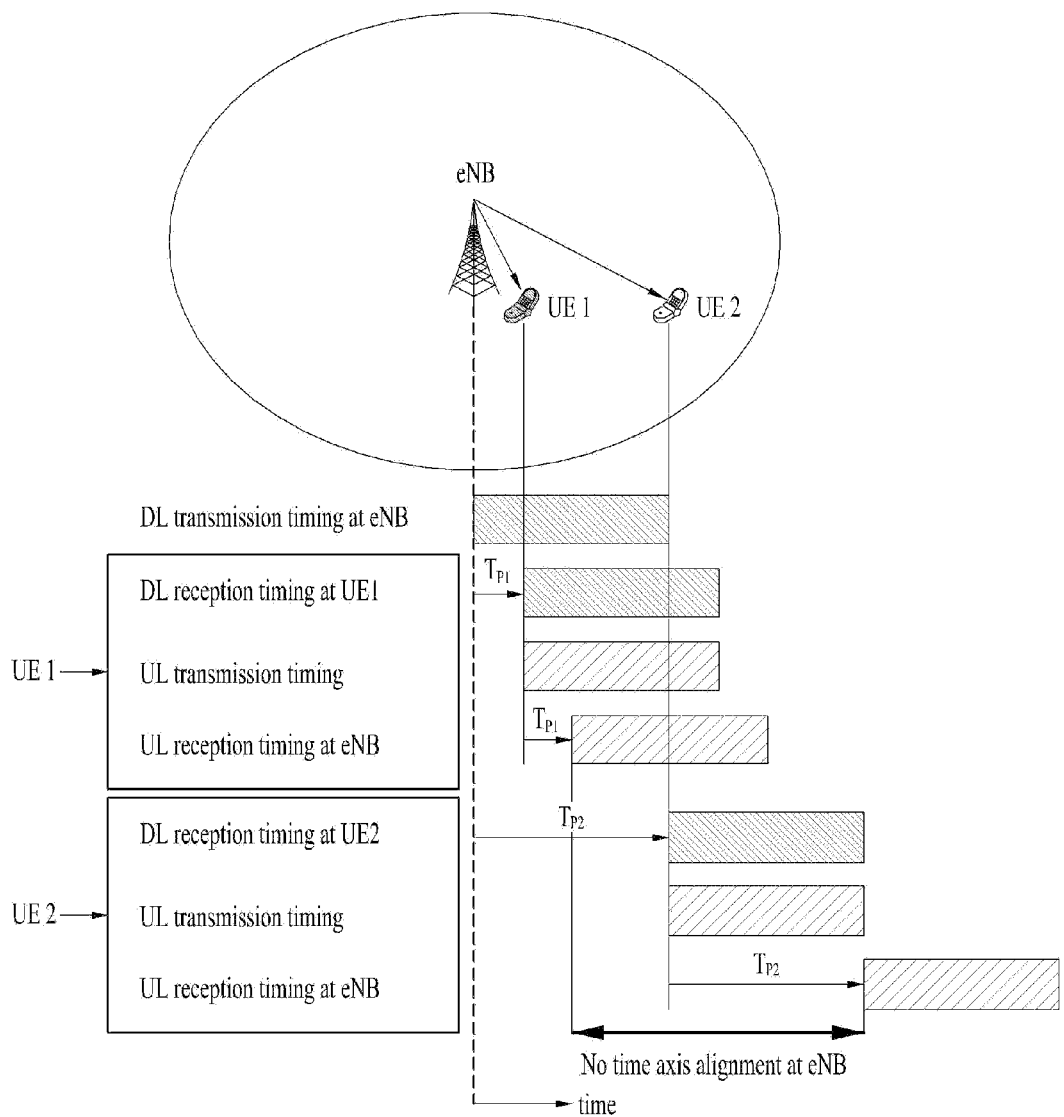
FIG. 9 and FIG. 10 are diagrams illustrating an example of time axis alignment of uplink transmission based on timing advance.
Figure 10:
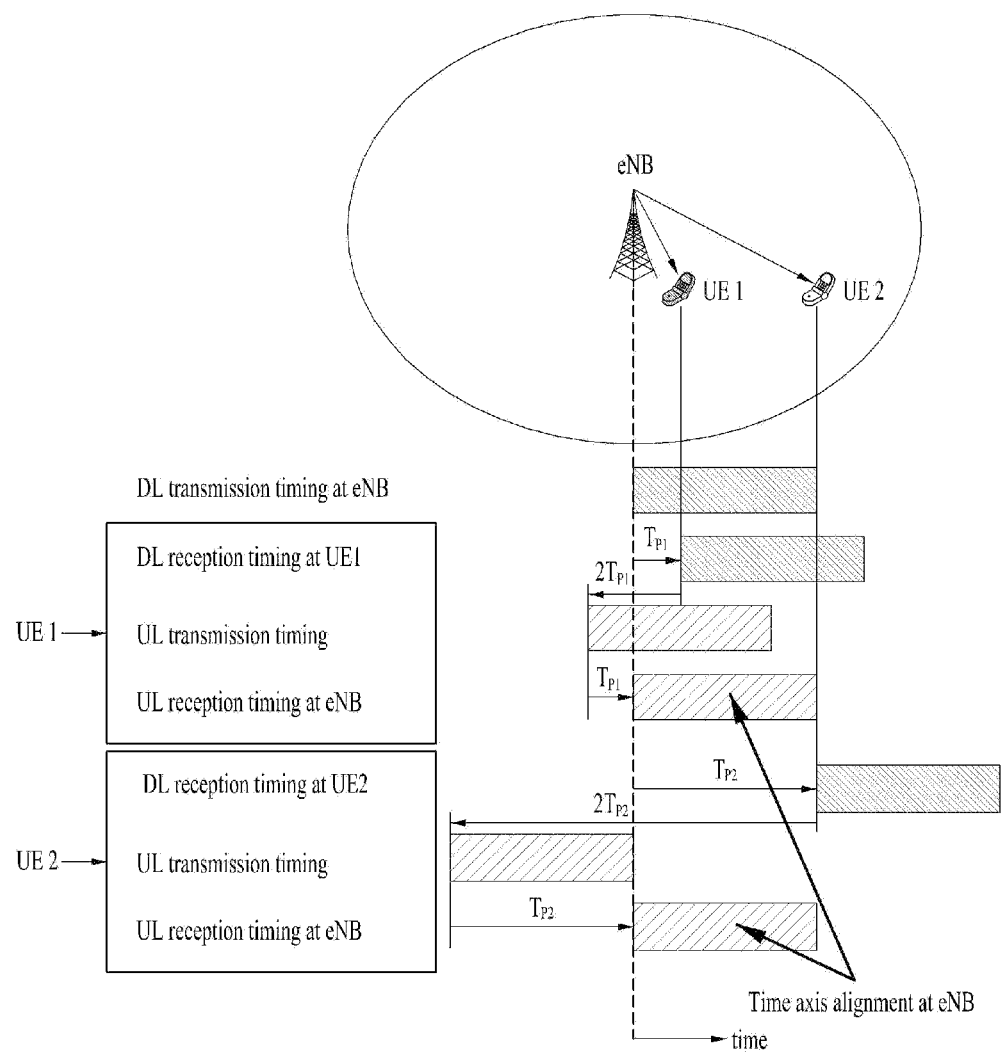

FIG. 9 and FIG. 10 are diagrams illustrating an example of time axis alignment of uplink transmission based on timing advance. In particular, in FIG. 9 and FIG. 10, it is assumed that the user equipment UE1 is located to be relatively closer to the base station and thus has short propagation delay $T_{P1}$, whereas the user equipment UE2 is located to be far away from the base station and thus has relatively long propagation delay $T_{P2}(T_{P1} < T_{P2})$.

It is noted from FIG. 9 that time axis alignment is not performed for uplink transmission in the base station as timing advance is not applied. However, it is noted from FIG. 10 that time axis alignment is applied to each uplink signal in view of the base station as the UE1 and the UE2 perform uplink transmission by applying timing advance.

As shown in FIG. 10, a value of propagation delay may be downlink timing received in the user equipment, and the propagation delay is converted into round trip-delay (RTD) to perform timing advance, whereby the value of the RTD becomes twice of the propagation delay. Accordingly, the user equipment, which is far away from the base station and has long propagation delay, should perform uplink transmission for time axis alignment in the eNB.

The timing advance procedure includes an initial timing advance procedure and a timing advance update procedure as follows. Each of the initial timing advance procedure and the timing advance update procedure will be described in detail.

1) Initial Timing Advance Procedure

In the LTE system, the user equipment synchronizes with an initial receiver for downlink transmission from the eNB, and performs timing advance by using a random access procedure. In other words, the eNB measures uplink timing through a random access preamble transmitted from the user equipment, and forwards a random access response message, which includes initial timing advance command of 11 bits corresponding to the uplink timing.

2) Timing Advance Update Procedure

Figure 11:
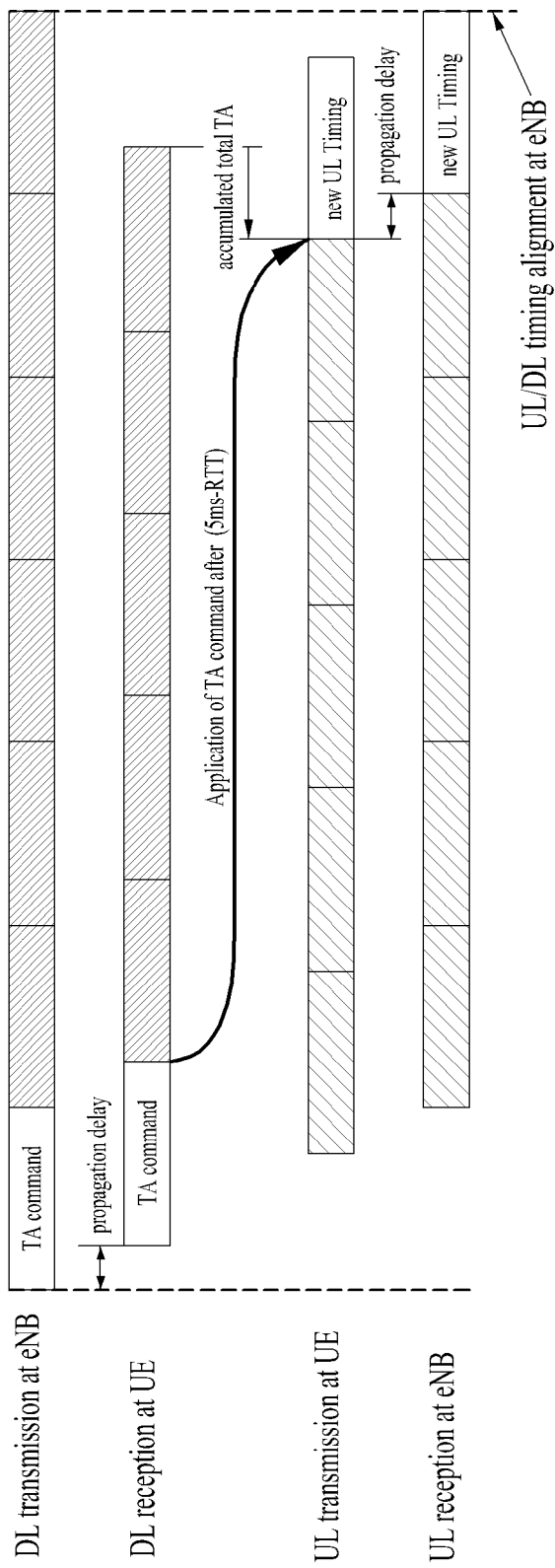
FIG. 11 is a diagram illustrating an update procedure of timing advance.

FIG. 11 is a diagram illustrating an update procedure of timing advance.

When performing the timing advance update procedure, the eNB may use all available uplink reference signals (UL-RS). In other words, sounding reference signal (SRS), channel quality indicator (CQI), ACK/NACK, etc. may be included in the uplink reference signals. Generally, if UL-RS corresponding to wide-band is used, timing estimation accuracy becomes increased, whereby SRS may be advantageous. However, the cell edge user equipment may be restricted due to transmission power limitation.

However, since this uplink timing advance update is the issue in implementing the eNB, the standard does not disclose any restriction. Timing advance update is applied after '5 ms—RTT (round trip time)' since the user equipment receives a timing advance command. In the TDD system and the half-duplex FDD system, since uplink subframe may not exist at the corresponding transmission timing in accordance with UL/DL subframe configuration, timing advance update is applied during first uplink subframe transmission after '5 ms—RTT'. In this case, RTT becomes twice of the value of propagation delay.

In the meantime, as described above, the distributed node system may be provided in the next generation communication system. The distributed node system may include a macro cell or center cell, which is operated with relatively great coverage, and a plurality of nodes (hereinafter, referred to as RRH) operated with relatively small coverage.

Figure 12:
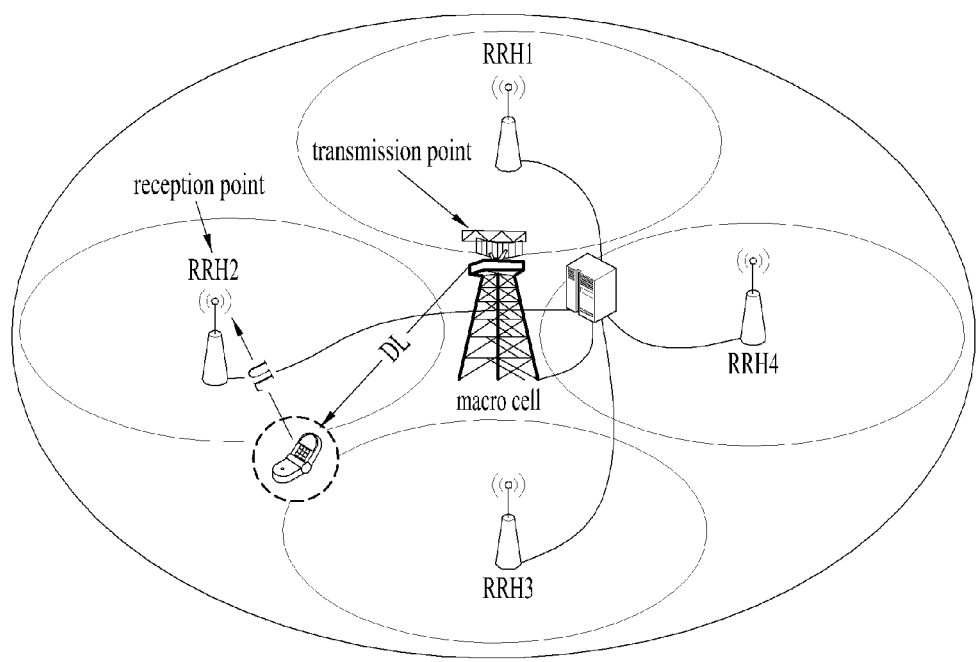
FIG. 12 is a diagram illustrating a problem that may occur if a transmission node is different from a reception node in a distributed node system.

FIG. 12 is a diagram illustrating a problem that may occur if a transmission node is different from a reception node in a distributed node system.

Referring to FIG. 12, it is noted that coverage of nodes configured by a plurality of RRHs is different from that of the macro cell. In the current standardization assembly, studies and standardization for various MIMO schemes and coordination based communication schemes between RRH and macro cell are in progress. As described above, for utilization of a plurality of RRH nodes and the center base station, a method for dividing a transmission node or transmission point (TP) from a reception node or reception point (RP) has been issued as shown in FIG. 12.

The method is the essential technology caused by a channel environment of the base station and the user equipment. In this method, downlink data reception from a macro cell having relatively high transmission power may be advantageous for the user equipment, and uplink data transmission to RRH node closer to the user equipment than the macro cell which is relatively far away from the user equipment may be advantageous due to transmission power limitation of the user equipment to maintain link quality and enhance frequency efficiency. On the other hand, divisional application of TP/RP may be performed. That is, the uplink may be transmitted to the macro cell while the downlink may be received from the RRH.

Basically, the TDD system estimates the downlink channel as well as the uplink channel by using the sounding reference signal (SRS). In other words, if the user equipment receives a downlink signal from the macro cell, it should transmit the SRS to the macro cell, that is, TP, to estimate the downlink channel to which the downlink signal is transmitted. Under the circumstances, the user equipment may transmit the PUCCH and the PDSCH separately from SRS transmission to the RP. Accordingly, in a state that TP and RP of the user equipment are separated from each other as shown in FIG. 12, a problem occurs in that collision may occur between SRS transmission and PUCCH and PDSCH transmission. This will be described in more detail.

Figure 13:
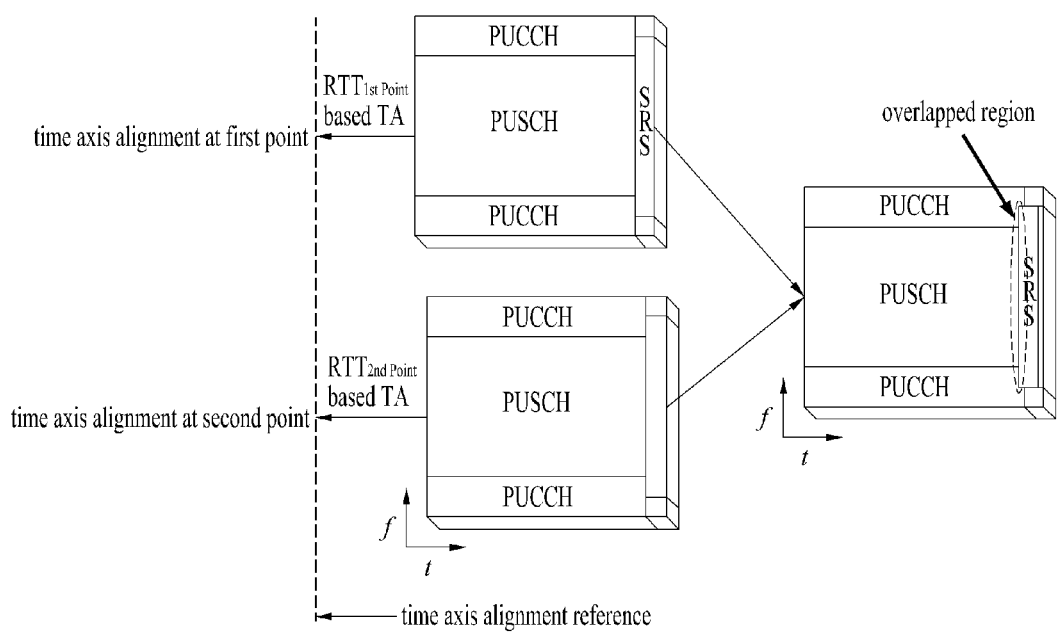
FIG. 13 is another diagram illustrating a problem that may occur if a transmission node is different from a reception node in a distributed node system.

FIG. 13 is another diagram illustrating a problem that may occur if a transmission node is different from a reception node in a distributed node system.

Referring to FIG. 12 and FIG. 13, for SRS transmission for downlink channel estimation from the macro cell, the user equipment should perform SRS transmission for time axis alignment in view of the macro cell. In addition, the PUCCH for transfer of the A/N and CQI and the PUSCH for data transfer should be transmitted for time axis alignment to an adjacent node, RRH2.

At this time, timing advance of the SRS should be performed more early considering propagation delay with the macro cell which is relatively far away from the user equipment. On the other hand, timing advance becomes short for uplink transmission of the RRH2 having a relatively short distance due to shorter propagation delay.

Accordingly, a problem may occur in that the user equipment may fail to map all of the SRS, the PUCCH and the PUSCH in the same subframe structure, or some symbol regions may be overlapped with each other as shown in FIG. 13. In other words, the SRS is allocated to the last symbol of the UL subframe, and in this case, the SRS region is moved forwardly by the greater TA value, whereby some region of the previous symbol is affected by the SRS region. Accordingly, ambiguity in resource allocation of the user equipment may occur due to timing advance of the SRS, or damage of a data region or control information damage of the PUCCH, which transmits ACK/NACK, may occur as maximum two symbol regions within the subframe are not used by the SRS due to the SRS.

In particular, unlike the PUSCH which is the data transport channel, in case of the PUCCH, if a shorted sequence of spreading sequences applied to the PUCCH is used, the last symbol may not be used but there is no spreading sequence that may be used additionally if two symbols are affected by the SRS region, whereby the problem occurring in the TP/RP divisional communication may not be solved basically.

In order to solve the above problem, TA value applied to the SRS should be different from that applied to the PUCCH/PUSCH. However, since the SRS is transmitted from the last symbol of the PUCCH/PUSCH in the 3GPP LTE/LTE-A system, a problem may occur in that the last symbol is overlapped with its previous symbol.

This problem may occur even in case that a carrier (or cell) through which the SRS is transmitted is different from a carrier (or cell) through which the PUCCH/PUSCH is transmitted in a state that the carrier aggregation scheme is used. This is because that timing advances applied to the respective carriers may be different from each other when the carrier aggregation scheme is used.

The present invention suggests solutions for the aforementioned problem.

First Embodiment

In the first embodiment of the present invention, if timing advance values of a first uplink channel (or signal) and a second uplink channel (or signal) satisfy a certain condition or do not so, it may be considered that only one of the first uplink channel and the second uplink channel is transmitted.

In other words, in the example of the LTE/LTE-A TDD system, if the SRS is overlapped with the PUCCH/PUSCH for some time period as TA of the SRS is greater than that of the PUCCH/PUSCH, one of the SRS and the PUCCH/PUSCH is not transmitted. The user equipment should include a timing advance value per uplink channel or uplink signal, and update based on movement of the user equipment and change of the channel status should be performed individually.

Second Embodiment

The second embodiment of the present invention suggests that SRS is transmitted for a period UpPTS within a special subframe while PUCCH/PDSCH is transmitted for a normal uplink subframe if the SRS is overlapped with the PUCCH/PDSCH for some time period.

In more detail, if the difference between timing advance values of the SRS and the PUCCH/PUSCH, which should be transmitted for a normal uplink subframe, satisfies a certain condition in the suggested method 2, for example, if a difference value between TA1 of the SRS and TA2 of the PUCCH/PUSCH is more than a preset value, the SRS is transmitted for the period UpPTS of the special subframe, which precedes the normal uplink subframe, and the PUCCH/PUSCH is transmitted for the normal uplink subframe.

Figure 14:
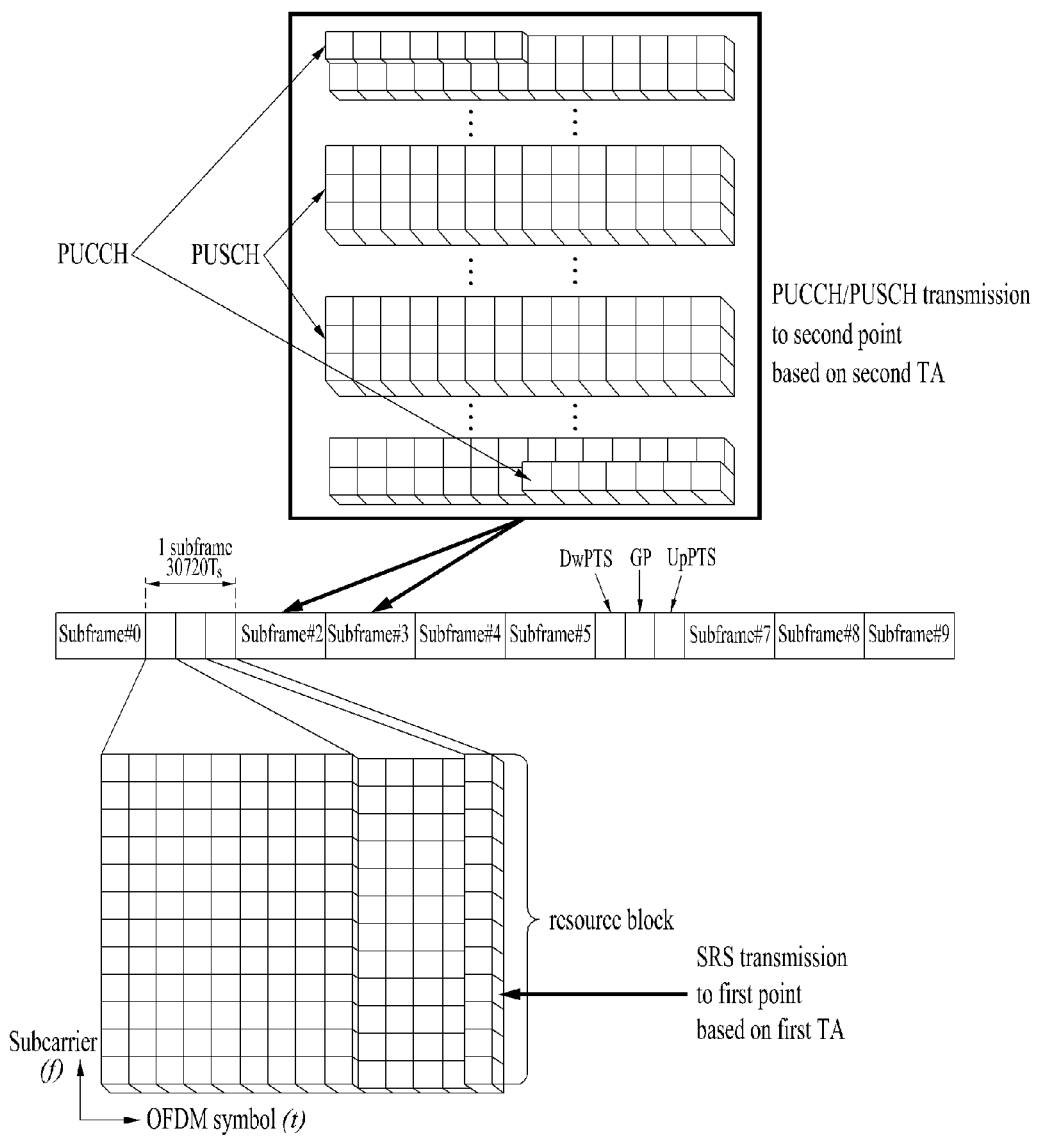
FIG. 14 is a diagram illustrating an example of separate timing advance applied to SRS and PUCCH/PDSCH in accordance with the second embodiment of the present invention.

In the subframe structure of the LTE/LTE-A TDD system, a special subframe is defined for switching between a downlink subframe and an uplink subframe. As shown in FIG. 14, the SRS with a timing advance value different from that of the PUCCH/PUSCH may be transmitted to the UpPTS symbol period located at the rear part of the special subframe and the PUCCH/PUSCH may be transmitted to the other normal uplink subframe. This is because that the transmission regions of DwPTS and UpPTS are not overlapped with each other due to a guard period located between the DwPTS and the UpPTS within the special subframe.

FIG. 14 is a diagram illustrating an example of separate timing advance applied to SRS and PUCCH/PDSCH in accordance with the second embodiment of the present invention.

As shown in FIG. 14, according UL/DL subframe configuration of the LTE TDD system, since uplink subframes are located next to the special subframe and a transmission time is moved forwardly, PUCCH/PUSCH transmission is not affected by transmission of SRS having greater TA.

Third Embodiment

The third embodiment of the present invention suggests that PUCCH/PDSCH is not transmitted for a symbol overlapped with SRS if the SRS is overlapped with the PUCCH/PDSCH for some time period. The PUSCH performs puncturing or rate matching in accordance with the number of reduced symbols, and the PUCCH uses a shortened spreading sequence or is replaced with the PUSCH.

In more detail, in the third embodiment of the present invention, puncturing or rate matching is performed considering the number of available resource elements (Res) located at the symbol except for the symbols overlapped with the SRS. If the SRS transmission region is set at both ends of a frequency band within an uplink subframe and overlapped with the existing PUCCH region, PUCCH transmission allocated to the corresponding region is not performed and is not replaced with non-periodic CSI transmission based on the PUSCH of ACK/NACK and CQI. In other words, ACK/NACK and CQI is subjected to the PUSCH through piggyback and transmitted together with normal data. Alternatively, the shortened spreading sequence may newly be applied considering the symbols overlapped with the SRS to avoid the region overlapped with the symbols for SRS transmission.

Fourth Embodiment

The fourth embodiment of the present invention suggests that an overlapped time period of a second uplink channel (or signal) is not transmitted and cyclic postfix equivalent to a length of the time period is transmitted to the end part of the second uplink channel if a first uplink channel (or signal) is overlapped with the second uplink channel (or signal) preceded by the first uplink channel.

In more detail, if the SRS is overlapped with the PUCCH/PDSCH in the LTE/LTE-A system, cyclic prefix overlapped with the existing PUCCH/PUSCH symbol region of SRS symbol period is shifted to the rear part. Through this method, substantial transmission time is more delayed than the timing advance value, whereby SRS transmission may have the same transmission timing as the timing advance value of the existing PUCCH/PUSCH transmission.

Figure 15:
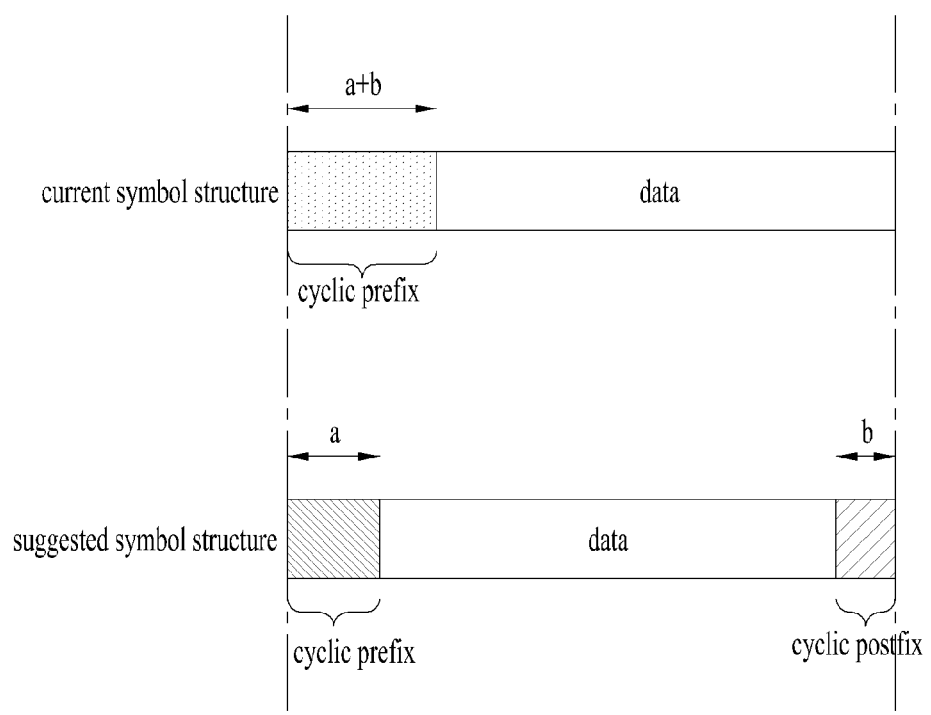
FIG. 15 is a diagram illustrating a concept of shift of a part of cyclic prefix of SRS symbols to a rear part in accordance with the fourth embodiment of the present invention.

FIG. 15 is a diagram illustrating a concept of shift of a part of cyclic prefix of SRS symbols to a rear part in accordance with the fourth embodiment of the present invention.

Referring to FIG. 15, it is noted that full symbol lengths are the same as each other in the existing symbol structure and the suggested symbol structure. It is also noted that the existing cyclic prefix length (a+b) is the same as a length of reconfigured partial cyclic prefix ('a' of FIG. 15)+reconfigured partial cyclic postfix ('b' of FIG. 15). Accordingly, although the reconfigured partial cyclic postfix may be punctured, a problem occurs in that inter-symbol interference may be increased.

Figure 16:
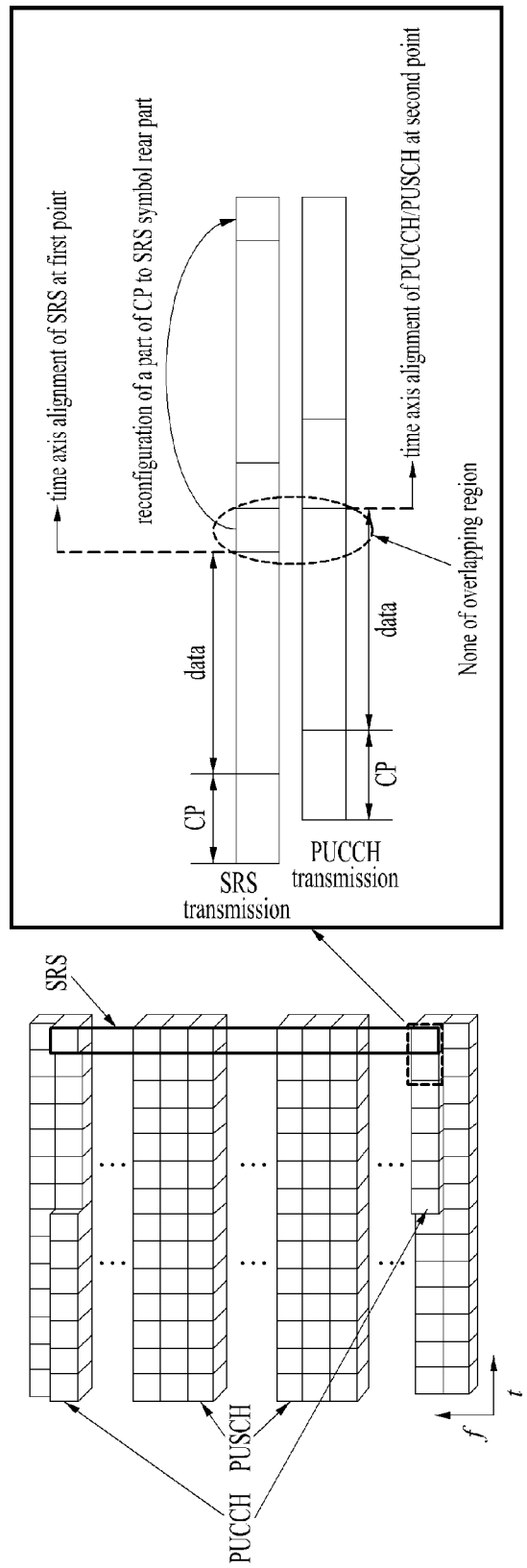
FIG. 16 is a diagram illustrating an example of transmission of SRS and PUCCH/PDSCH in accordance with the fourth embodiment of the present invention.

FIG. 16 is a diagram illustrating an example of transmission of SRS and PUCCH/PDSCH in accordance with the fourth embodiment of the present invention.

Referring to FIG. 16, if the reconfigured partial cyclic prefix and the reconfigured partial postfix are applied to the SRS in accordance with the fourth embodiment of the present invention, the SRS to a first point is transmitted prior to the last transport symbol period of the subframe, whereby SRS transmission to the first point may not collide with PUCCH/PDSCH transmission to a second point.

Figure 17:
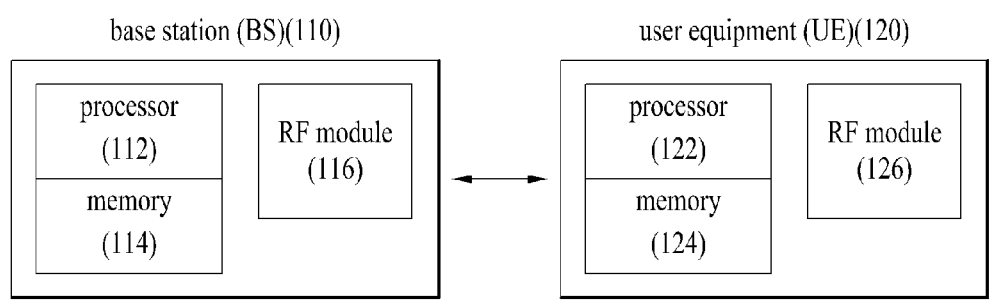
FIG. 17 is a diagram illustrating a base station and a user equipment, which can be applied to the embodiment of the present invention.

FIG. 17 is a diagram illustrating a base station and a user equipment, which can be applied to the embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 17, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for transmitting uplink signals from a user equipment to a base station in a wireless communication system and the apparatus for the same have been described based on the 3GPP LTE system, they may be applied to various wireless communication systems in addition to the 3GPP LTE system.

The invention claimed is:

1. A method for transmitting signals by a user equipment (UE) in a time division multiplexing wireless communication system, the method comprising:

transmitting, by the UE, a first uplink signal via an uplink subframe in accordance with a first timing advance value that precedes a reference time;

transmitting, by the UE, a second uplink signal via the uplink subframe in accordance with a second timing advance value that precedes the reference time, when a difference value between the first timing advance value and a second timing advance value is not greater than a preset value; and when the difference value is greater than the preset value, transmitting, by the UE in accordance with the second timing advance value, the second uplink signal via an uplink pilot time slot (UpPTS) period of a special subframe that precedes the uplink subframe, wherein the second timing advance value is greater than the first timing advance value.

2. The method according to claim 1, wherein the special subframe includes a downlink pilot time slot (DwPTS) for downlink reception, a guard period (GP) for transmission and reception switching, and the UpPTS for uplink transmission, in due order.

3. The method according to claim 1, wherein the first uplink signal is uplink control information or uplink data information, and the second uplink signal is a sounding reference signal.

4. The method according to claim 1, wherein the first uplink signal is transmitted through a carrier different from that through which the second uplink signal is transmitted.

5. The method according to claim 1, wherein the first uplink signal is transmitted to a first reception point and the second uplink signal is transmitted to a second reception point.

6. The method according to claim 5, wherein the distance between the user equipment and the second reception point is longer than that between the user equipment and the first reception point.

7. The method according to claim 1, wherein the preset value is one of a length of a first symbol and a length of a second symbol.

8. A user equipment in a time division multiplexing wireless communication system, the user equipment comprising:
- a wireless communication module for transmitting and receiving signals to and from at least one base station; and
- a processor for controlling the wireless communication module, wherein the processor is configured to:
- transmit a first uplink signal via an uplink subframe in accordance with a first timing advance value that precedes a reference time;
- transmit a second uplink signal via the uplink subframe in accordance with a second timing advance value that precedes the reference time, when a difference value between the first timing advance value and a second timing advance value is not greater than a preset value; and
- when the difference value is greater than the preset value, transmit the second uplink signal in accordance with the second timing advance value via an uplink pilot time slot (UpPTS) period of a special subframe that precedes the uplink subframe, wherein the second timing advance value is greater than the first timing advance value.

9. The user equipment according to claim 8, wherein the special subframe includes a downlink pilot time slot (DwPTS) for downlink reception, a guard period (GP) for transmission and reception switching, and the UpPTS for uplink transmission, in due order.

10. The user equipment according to claim 8, wherein the first uplink signal is uplink control information or uplink data information, and the second uplink signal is a sounding reference signal.

11. The user equipment according to claim 8, wherein the first uplink signal is transmitted through a carrier different from that through which the second uplink signal is transmitted.

12. The user equipment according to claim 8, wherein the first uplink signal is transmitted to a first reception point and the second uplink signal is transmitted to a second reception point.

13. The user equipment according to claim 12, wherein the distance between the user equipment and second reception point is transmitted is longer than that between the user equipment and the first reception point.

14. The user equipment according to claim 8, wherein the preset value is one of a length of a first symbol and a length of a second symbol.

* * * * *